Aug. 30, 1932.  C. J. IRWIN  1,874,536
METHOD OF MAKING MILLING CUTTERS
Filed Dec. 5, 1930
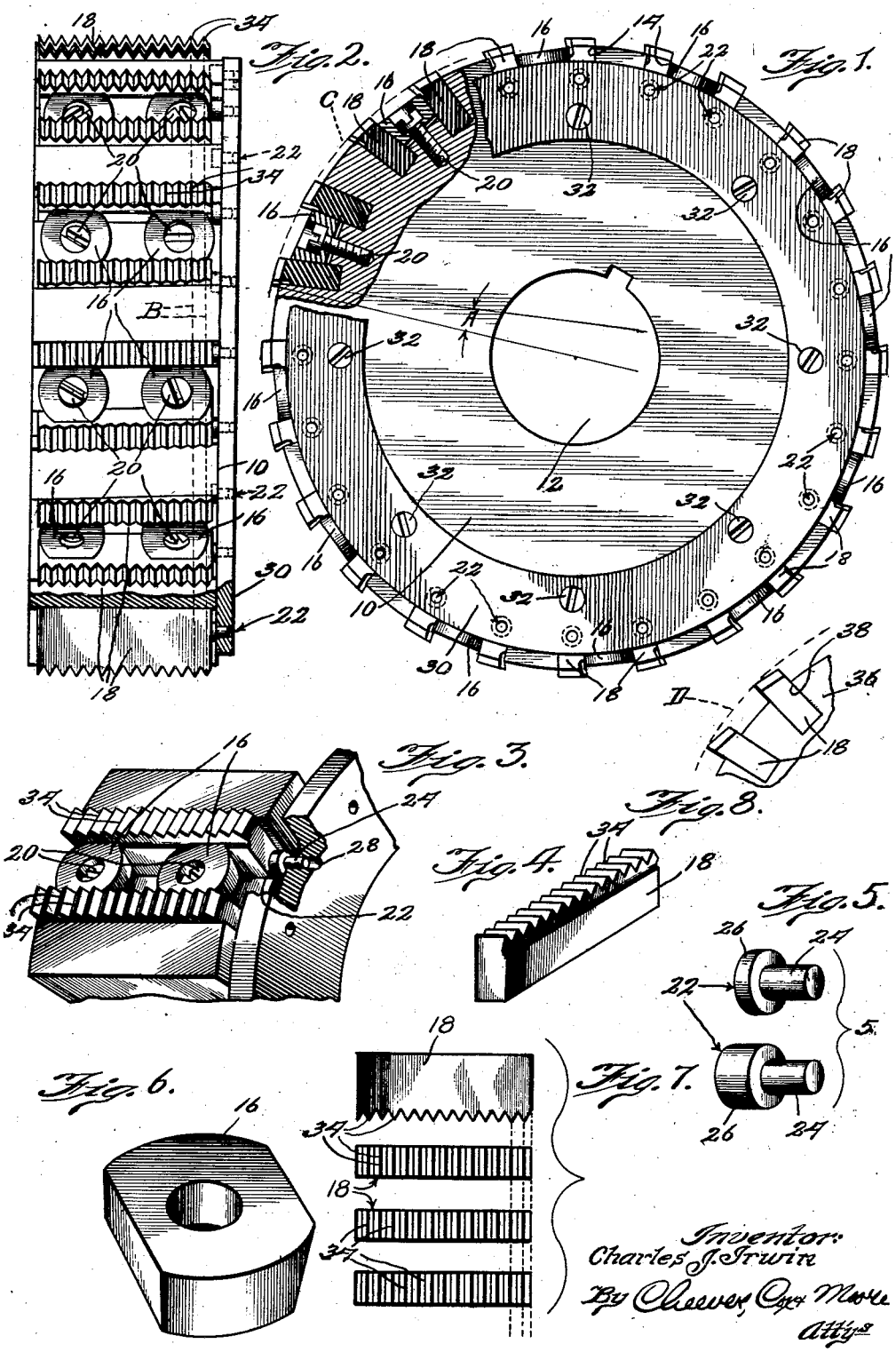
Inventor:
Charles J. Irwin
By Cleever, Orr More
Atty Patented Aug. 30, 1932

1,874,536

UNITED STATES PATENT OFFICE

CHARLES J. IRWIN, OF CHICAGO, ILLINOIS, ASSIGNOR TO ILLINOIS TOOL WORKS, OF CHICAGO, ILLINOIS, A CORPORATION OF ILLINOIS

METHOD OF MAKING MILLING CUTTERS

Application filed December 5, 1930. Serial No. 500,199.

My invention relates generally to means for and methods of making milling cutters, and more particularly to methods and means, whereby inserted milling cutter blades may be produced.

When inserted blade milling cutters are employed to cut a predetermined form in a work piece, it is imperative that the formed cutting edges of each blade be in accurate circumferential alinement with the next succeeding cutting edge. Thus, for example, if an inserted blade cutter is to be used for milling threads, the blades thereof must be provided with a plurality of cutting teeth corresponding in shape with the threads to be cut, and the individual teeth in each blade must necessarily occupy a predetermined circumferential alinement with the corresponding teeth of the succeeding or next following blade. My present invention relates to methods and means, whereby blades of the inserted type may be provided with cutting teeth in such a manner that, when the blades are finally mounted within a suitable cutter body, they will produce the desired form in a work piece.

It is one of the primary objects of my present invention to provide an improved and effective method of manufacture, whereby inserted blades may be first formed with a tooth or teeth having a predetermined shape, and which may then be very conveniently mounted within a cutter body so that the tooth or teeth of each blade will be positioned in predetermined circumferential alinement with the remaining blades.

Another object of my invention is to provide a novel and effective method, whereby inserted blades for milling cutters, before insertion thereof within their companion cutter body, may be subjected to a helical cut by any suitable machining or grinding tool so as to provide teeth in the blades having the desired shape, and said blades may be subsequently inserted within their cutter body so that the tooth in one blade will be in non-helical alinement with the companion tooth in the next following blade. In other words, I propose to provide helically disposed teeth in the blades prior to their application to the cutter body, in such a manner that, when the blades are finally mounted within the body, their helical disposition will be altered, and the teeth of the blades will lie in planes perpendicular to the axis of the cutter body.

More specifically, my invention contemplates the provision of novel and effective means for practicing the above mentioned method, and to this end I propose to employ a master body in which blades may be mounted, subjected to a helical cut and subsequently transferred to a cutter body.

Still more specifically, it is an object of my invention to provide means in the form of the master body set forth above, wherein blades may be mounted in such a manner that each blade has a different axial disposition in the master body from the next succeeding or following blade. By this construction I am able to provide a helical groove or cut within the blades thus mounted in the master body, and subsequently the blades may be mounted in a conventional manner within a cutter body so that each blade occupies the same axial disposition with respect to the cutter body as the next succeeding or following blade, thereby altering the helical arrangement of the teeth in the blades which was formerly produced in the master body.

A still further object of my invention is to provide a simple and economical method of producing inserted blades and the like from material which does not readily lend itself to the usual machining methods as, for example, material such as "Stellite" and other similar products, and to this end I propose to helically grind a plurality of blades, such as "Stellite" in a master body and subsequently mount the ground blades in a milling cutter body so as to alter the helical disposition of the cuts made while the blades were mounted in the master body.

Another object is to provide inserted blades in the manner set forth above which are inclined at a given angle with respect to a radial plane of the master body, which angle of inclination is greater than the inclination of the blades when they are subsequently mounted within the cutter body, thereby enabling the blades, when mounted in the cutter body, to have a definite and desired peripheral relief.

The foregoing and numerous other objects and advantages will be more apparent from the following detailed description when considered in connection with the accompanying drawing, wherein—

Figure 1 is a side elevational view of an apparatus, by means of which my improved method of forming milling cutter teeth or blades may be effectively practiced, a portion of said apparatus or master body being broken away to more clearly disclose the position of the blades mounted therein;

Figure 2 is an elevational view taken from the left of Figure 1;

Figure 3 is an enlarged fragmentary perspective view of a portion of the master body and its associated parts to more clearly disclose the manner in which blades are mounted therein;

Figure 4 is a perspective view of a detached inserted blade;

Figure 5 discloses two of the adjusting pins which serve to laterally adjust the position of the blades within the master body;

Figure 6 is a perspective view of one of the clamping members;

Figure 7 is an illustrative disclosure of the blades to more clearly show the alined position of the blades after they have been removed from the master body and inserted within the body of a milling cutter; and Figure 8 is a fragmentary side elevational view of a milling cutter body equipped with blades formed by practicing my improved method, said view being shown for the purpose of illustrating the peripheral relief in the inserted cutter blades.

Referring now to the drawing more in detail wherein like numerals have been employed to designate similar parts throughout the various figures, it will be seen that my improved method of forming inserted teeth or blades of a milling cutter may be effectively practiced by employing a master rotary body or member 10. This body 10 is similar in structural characteristics to the body of a milling cutter, and as such is provided with a central opening 12 for receiving a suitable arbor or spindle, and which is provided with a plurality of peripheral transverse slots 14, said slots having oppositely disposed walls which are arranged in substantial parallelism. A portion of the body stock positioned intermediate each pair of adjacent slots 14 is removed for the purpose of receiving clamping members 16, as clearly shown in the drawing. The slots 14 are adapted to receive inserted cutter blades 18, and it will be seen that, when the clamping members 16 are tightened by means of suitable tightening screws 20, each pair of blades will be securely held in position within the master body 10.

Attention is also directed to the fact that the side walls of the slots 14 and consequently the sides of the blades 18 mounted therein are inclined with respect to a radial plane of the body 10, this angle of inclination being clearly shown and designated by the letter A in Figure 1. The reason for mounting the blades within the body 10 in this manner will be more readily appreciated as the description progresses. It will suffice at this point to state that each of the blades are inclined with respect to a radial plane, as indicated in Figure 1, and that said blades are secured against radial displacement by means of the clamping members 16, which clamping members are provided with oppositely disposed clamping surfaces, one of said surfaces being tapered more than the other, thus serving, when the screws 20 are tightened within the body, to securely clamp the blades positioned on opposite sides of said clamping member. I prefer in the particular embodiment disclosed in the drawing to employ a pair of clamping members 16 for each pair of blades. However, my invention is in no sense limited to this particular construction, but is capable of other structural designs without departing from the spirit and scope of said invention.

In order to illustrate one practical use of my improved method of forming cutter blades, I have selected blades which are to be employed for cutting threads and the like. If the blades 18 are made of material such as high speed steel, I employ the blade mounting just described for securing the blades in position when teeth are cut therein. In this connection it will be seen that when the blades 18 are initially inserted within the body 10, each blade is positioned axially within its companion slot by means of positioning pins 22. Each of these pins includes a shank 24 and a head 26. It will be seen that the shanks 24 are inserted within apertures 28 provided with an annular member or ring 30, which is secured to the body by means of suitable screws 32. These apertures are arranged in circular alinement, and it will be noted that the width of the heads 26 of one of the pins 22 varies from the width of the next adjacent pins. In other words, the variation in widths of the head 26 is such that the inner ends thereof are positioned within the path of a helix. Thus, the blades 18 are displaced axially with respect to each other so as to conform with the helix which is determined by the inner ends of the pins 22. The reason for this construction will be more clearly apparent as the description progresses.

After the blades 18 are mounted within the body 10 in the helical position as determined by the inner surfaces of the pins 22, the clamping members 16 are tightened in place so as to securely hold the blades within the body 10. The body 10 having the blades 18 mounted therein may then be set up in a suitable lathe or other machine, and a cutting tool (not shown) applied to the outer or peripheral surfaces of the blades and moved longitudinally of the blades so as to cut a helical groove therein, and in this manner provide a plurality of V-shaped teeth 34 in the blades. The longitudinal travel of the cutting tool will be such as to cut helical grooves having a helix angle which corresponds with the helix angle determined by the inner surfaces of the pins 22. In Figure 2 I have disclosed the cutter body and teeth after the helical teeth 34 have been cut in the blades 18, and the helical circumferential alinement of the teeth is shown by dotted lines designated by the letter B. It will be noted that these lines B designate a helical path which is parallel with the helical path determined by the inner surfaces of the pins 22. It will also be observed that the peripheral surfaces of the teeth 34, as indicated by the dotted line C in Figure 1, are concentric with the axis of the body 10. The cutting of the teeth 34 just described is similar to the operation of cutting threads on a screw with the possible exception that the blades are axially disposed with respect to each other so as to conform to a helix having a lead equal to the pitch of the thread. Obviously, machines other than lathes may be employed to turn the tops of the blades. In fact, these teeth may be formed in a milling or hob machine by using several V-shaped cutters (not shown).

After the threads or teeth 34 have been cut in the tops of the blades, said blades are hardened. After hardening, the sides of the blades are ground to the proper thickness, and the bottom is ground perfectly straight. A second master body similar to the body 10 having slots conforming in width to the finished thickness of the blades may be employed for the final grinding of the threads or teeth 34. The blades are set up within the second master body and are again axially disposed by means of the pins or buttons 22 and clamped in position by means of suitable clamps, such as the clamping members 16. A grinding wheel, such as a single edged wheel (not shown) may now be employed to grind the sides of the teeth 34, said wheel being moved longitudinally of the master body in accordance with the lead of the threads or teeth 34.

After the grinding operation upon the teeth of the blades has been completed, they may then be mounted in a suitable milling cutter body, such as a body 36 shown fragmentarily in Figure 8. In this connection reference is made to the co-pending application of Frank W. England, Serial No. 500,171, filed of even date herewith, wherein a milling cutter blade construction and means for holding same in position are disclosed. The blades 18 shown in the present invention may be formed in the manner shown in the above mentioned co-pending application and mounted within the milling cutter body. When the blades 18 are mounted in the milling cutter body, the teeth 34 are alined as shown in Figure 7. That is to say, the original helical disposition of the teeth, which was presented in the master body, is altered so that the tops of the teeth determine a plurality of adjacently positioned circular paths as distinguished from the helical path described above in connection with the form of the teeth 34 in the master body. In other words, the ends of the blades 18, instead of being disposed in a helical path, are now positioned within a plane perpendicular to the axis of the milling cutter body. The slots 38 in the milling cutter body 36 are substantially radial, or if inclined with respect to the radial plane of the cutter body, the angle of inclination is considerably less than the angle designated by the letter A in Figure 1 of the master body 10. In this manner I am able to provide the desired relief in the peripheral surfaces of the blades 18, as clearly shown in Figure 8. In Figure 8 I have shown a dotted line D which is concentric with the axis of the cutter body 36, and it will be seen that the outer edges of the blades 18 are now eccentrically positioned with respect to the center of the milling cutter body 36 so as to present the proper peripheral relief.

My invention is in no sense limited to milling cutter blades constructed of material, such as high speed steel, which lends itself very readily for machining operations. In fact, my invention has a very practical application in connection with the use of materials which cannot be very readily machined by the practice of ordinary methods such, for example, as "Stellite" and other similar hard products. "Stellite" blades are often produced by casting the metal within a mold to produce the required form. Thus the serrations or teeth 34 representing the thread on a thread milling cutter may be cast if the pitch of the threads is sufficiently large, and these blades may then be finished by grinding in the manner described above in connection with the grinding of the blades 18. If the pitch of the thread to be formed in the hard material, such as "Stellite", is sufficiently small, said threads may be cut in the blades by grinding alone. My invention also serves under such circumstances to enable the expeditious forming of teeth or threads in the blades.

From the foregoing it will be apparent that my invention has a very decided practical application in connection with the production of inserted tooth thread milling cutters. Obviously, the invention is in no sense limited to this particular type of cutter, but may be employed in any instance where it is desirable to perform similar milling operations upon a work piece. It will be apparent that various arrangements of the buttons or pins 22 may be employed which correspond to the desired lead in the teeth to be cut. Obviously, by axially displacing the blade 18 within the master body 10, as shown in Figure 2, the aggregate of the threaded edge determined by the teeth 34 will form a groove. However, by employing a master cutter body of relatively large diameter, the slight curvature introduced within the teeth 34 is so negligible that it may be ignored. In other words, when the blades are mounted within the cutter body as diagrammatically shown in Figure 7, the peripheral edges of each row of teeth will lie in a common plane perpendicular to the axis of the cutter body. My invention enables the production of formed milling cutter inserted blades by the practice of conventional machine shop operations, and the apparatus or means for securing the blades in position is of very simple and economical construction.

Having thus described my invention, what I claim as new and desire to secure by Letters Patent is:

1. The method of forming inserted blade milling cutters which consists in mounting blades in a suitable support, helically forming teeth in said blades, and then mounting said blades in a cutter body so as to alter the original helical disposition of the teeth therein.

2. The method of forming inserted blade milling cutters which consists in mounting a plurality of blades about a given axis, axially displacing said blades with respect to each other so as to position said blades in a helical path, applying a cutting tool so as to cut a plurality of helical teeth in said blades, and then mounting said blades in the body of a milling cutter so as to alter the helical disposition thereof.

3. The method of producing inserted blades for milling cutters and the like which consists in arranging said blades about a given axis, axially displacing said blades with respect to each other so as to position said blades in a helical path, and then producing a helical arrangement of teeth in said blades.

4. The method of producing inserted blades for milling cutters and the like which consists in concentrically arranging a plurality of blades within a rotary support, axially displacing said blades with respect to each other so as to position said blades in a helical path, rotating said support, and applying a cutting tool to produce helical teeth in said blades.

5. The method of producing inserted blades for milling cutters and the like which consists in arranging a plurality of blades about a given axis within a suitable support, helically forming teeth upon the outer surfaces of said blades, hardening said blades, arranging said blades about a given axis within a support with the teeth thereof helically disposed, and then grinding said helically disposed teeth.

6. The method of forming inserted blade milling cutters which consists in arranging a plurality of blades about a given axis within a suitable support, helically forming teeth upon the outer surfaces of said blades, hardening said blades, arranging said blades about a given axis within a support with the teeth thereof helically disposed, grinding said helically disposed teeth, and then mounting said blades in the body of a milling cutter so as to alter the helical disposition of the teeth in said blades.

7. The method of producing inserted blades for milling cutters and the like which consists in arranging a plurality of blades about a given axis within a suitable support, helically forming teeth upon the outer surfaces of said blades, hardening said blades, grinding the body of the blades to the desired size, arranging said blades about a given axis within a support with the teeth thereof helically disposed, and then grinding said helically disposed teeth.

8. The method of forming inserted blade milling cutters and the like which consists in arranging a plurality of blades about a given axis within a suitable support, helically forming teeth upon the outer surfaces of said blades, hardening said blades, grinding the body of the blades to the desired size, arranging said blades about a given axis within a support with the teeth thereof helically disposed, grinding said helically disposed teeth, and then mounting said blades in the body of a milling cutter so as to alter the helical disposition of the teeth in said blades.

9. The method of producing inserted blades for milling cutters and the like which consists in arranging a plurality of blades about a given axis of a support so as to incline said blades with respect to a radial plane of said support, axially displacing said blades with respect to each other so as to position the same in a helical path, and then forming helically arranged teeth in said blades.

10. The method of producing inserted blades for milling cutters and the like which consists in arranging a plurality of blades about a given axis of a support so as to incline said blades with respect to a radial plane of said support, axially displacing said blades with respect to each other so as to position the same in a helical path, forming helically arranged teeth in said blades, and mounting said blades in the body of a milling cutter with the teeth of the blades eccentrically arranged with respect to the axis of the cutter body and with said teeth arranged in non-helical circumferential alinement.

11. The method of producing inserted blades for milling cutters and the like which consists in arranging a plurality of blades concentrically with respect to the axis of a suitable rotary support and along the periphery thereof, axially displacing said blades with respect to each other so as to position same within a substantially helical path, clamping said blades in said position, cutting a plurality of helical teeth along the peripheral surfaces of said blades, hardening said blades, grinding the sides of said blades to proper thickness, concentrically arranging said blades with respect to the axis of a support, maintaining the helical disposition of the teeth thereof, and then grinding the teeth of said blades.

12. The method of producing inserted blades for milling cutters and the like which consists in concentrically arranging said blades with respect to a given axis of a suitable support, engaging one extremity of said blades with abutments having surfaces arranged in a helical path, whereby to arrange said blades in a similar helical path, and then producing helically disposed teeth along the outer peripheral surfaces of said blades.

In witness whereof, I have hereunto subscribed my name.

CHARLES J. IRWIN.